Patented Apr. 17, 1945

2,373,715

UNITED STATES PATENT OFFICE 2,373,715

PURIFICATION OF DIOLEFINS

Frank J. Soday, Swarthmore, Pa., assignor to The United Gas Improvement Company, a corporation of Pennsylvania No Drawing. Application February 18, 1943, Serial No. 476,334

18 Claims. (Cl. 260—681.5)

In general, this invention relates to the purification of unsaturated hydrocarbons.

More particularly, this invention relates to the separation of pure or relatively pure diolefins from fractions or mixtures containing the said diolefins.

An object of the present invention is the purification of diolefins by a combination of processes, each designed to remove certain undesirable materials. Another object of the invention is the isolation of pure or relatively pure diolefins from fractions or mixtures containing the same by processes comprising the application of specific refining operations designed to remove certain of the impurities present, followed by concentrating operations designed to remove most, or substantially all, of the diluents present. Other objects and advantages of the invention will be apparent to those skilled in the art upon an inspection of the specification and claims.

The material present in diolefin fractions or mixtures, other than diolefins, may be divided into two main classes, namely, impurities and diluents.

The impurities may include such materials as acetylenic hydrocarbons; oxygenated compounds such as aldehydes, acids, ketones, and/or peroxides; sulfur-containing compounds; nitrogen-containing compounds; and/or halide-containing compounds.

The diluents usually comprise paraffin hydrocarbons, olefins, other unsaturated hydrocarbons, aromatic hydrocarbons, and/or naphthenic compounds.

This distinction is somewhat artificial in character, but it is based upon functional considerations. Consequently, it possesses considerable significance from the standpoint of the industrial applications of the diolefins in question.

It is recognized that a given compound may be regarded as an impurity in certain applications and as a diluent in other applications. Thus, in the case of light oil butadiene fractions, isobutylene may be regarded as an impurity if the butadiene is to be used in the production of synthetic rubber, while it may function only as a diluent in certain other applications.

In general, it may be said that the compounds classed as impurities seriously affect the quality or yield of the product to be obtained from a given reaction. Thus, in the polymerization or copolymerization of one or more diolefins to form synthetic rubber, the presence therein of substantial quantities of acetylenic compounds, aldehydes, halogen-containing compounds, and/or similar impurities, usually results in the production of a very inferior product, and/or a very substantial reduction in yield. In general, the impurities act as catalyst poisons, polymerization inhibitors, chain reaction interruptors, and the like.

Diluents, on the other hand, are less specific in their action, and generally affect the nature and/or extent of the polymerizing reaction to a somewhat less marked degree than the materials classified previously as impurities. In general, they serve to reduce the reactivity of the diolefin or mixture of diolefins by reducing the concentration of such material in the reaction zone.

This must not be taken to mean that they do not deleteriously affect the yield or quality of the product obtained, particularly in the case of polymerizing reactions. Thus, in the polymerization or copolymerization of certain diolefins to form synthetic rubber, the yield of the said product falls off rapidly with decreasing concentration of diolefin below 98%, practically no product being obtained at concentrations below 80%.

In general, it may be said that the materials classified as impurities generally are present in diolefin fractions and/or mixtures in rather limited quantities, frequently comprising less than 5% and, in many cases, less than 1% of the total mixture. Diluents, on the other hand, may be present in much larger quantities, and may comprise the principal component or components in the diolefin fraction and/or mixture.

Thus, a representative light oil butadiene fraction may contain 50% butadiene, 25% isobutylene, 22% other butylenes, 2% butanes, 1% acetylenic hydrocarbons, 0.1% aldehydes, and smaller amounts of other oxygenated impurities, sulfur compounds, and nitrogen compounds.

I have discovered that fractions and/or mixtures containing one or more diolefins, impurities, and diluents may be processed to obtain the diolefin or mixture of diolefin in a pure or substantially pure state by subjecting the said fraction or mixture to refining operations to remove the desired proportion, or substantially all, of the impurities present, followed by the application of concentrating processes designed to remove substantial proportions, or practically all, of the diluents present.

The excellent results obtained by the foregoing method are due, in large measure, to the presence of the diluents during the removal of the impurities present, thus substantially reducing the losses normally encountered due to polymerization, and/or other causes, during this operation, as well as to the absence, or reduction in quantity of, certain impurities during the subsequent concentrating operation, thus preventing, or retarding the rate of the deterioration of the concentrating reagent.

A preferred embodiment of this invention is the removal of controlled quantities of certain impurities during the initial refining operations. Thus, in the case of acetylenic hydrocarbons, I frequently prefer to control the refining operations to give an intermediate product containing, say, 0.75 to 0.25% of acetylenic hydrocarbons, particularly when the subsequent concentrating operations are of a type to be more particularly described herein. In such concentrating operations the acetylenic hydrocarbons act as polymerization inhibitors, the presence of which in small quantity may be desired. The concentration operations are of such character as to give a product containing a negligible proportion of acetylenic hydrocarbons.

The diolefin fractions and/or mixtures which may be improved by my process may be obtained from any desired source such as synthetically, for example by the removal of the elements of chlorine or hydrogen chloride from polychlorinated compounds, by the partial hydrogenation of acetylenes or vinyl acetylenes, by the dehydrogenation of the corresponding paraffins and/or olefins, and by the dehydration of alcohols and glycols; by the pyrolysis of petroleum and petroleum hydrocarbons, such as by the pyrolysis of petroleum in the gaseous phase at temperatures above 1000° F., and more particularly above 1300° F., followed by condensation and fractionation, or the pyrolysis of terpenic hydrocarbons; and by the pyrolysis of other materials, such as by the pyrolysis of cyclic hydrocarbons, for example cyclohexane, or by the pyrolysis of alcohols, such as for example the pyrolysis of ethyl alcohol. In the latter case, the process may include a combination of dehydrating and/or pyrolytic reactions.

Thus, for example, in the preparation of butadiene, two important basic raw materials are petroleum, or petroleum hydrocarbons such as $C_4$ hydrocarbons, and ethyl alcohol.

Due to the relatively large proportions of impurities present in the butadiene obtained from ethyl alcohol, particularly oxygenated impurities, the method disclosed is unusually well adapted to treating the crude product obtained from such material.

It is to be understood, of course, that the mixtures and/or fractions obtained from the foregoing operations may contain more than one diolefin, and that such mixture of diolefins may be isolated in more pure form by the method disclosed herein prior to any separation of such diolefins.

Although the method is adapted to the refining of diolefins, and particularly conjugated diolefins, in general, I find it to be particularly applicable to the refining of fractions and/or mixtures containing one or more diolefins selected from a list consisting of butadiene, isoprene, and piperylene.

The first stage of the operation for the production of pure or relatively pure diolefins from dilute fractions and/or solutions containing the same, namely, the removal of impurities, may be carried out in a number of ways.

A preferred method for removing the impurities present in diolefin fractions and/or mixtures comprises the application in finely divided form of at least one metal of group Ia and group IIa of the periodic table, as well as certain active alloys thereof. Particularly desirable results are obtained by the use of finely divided alkali and alkaline earth metals.

Such operations preferably are carried out in a continuous manner and in the presence of polymerization inhibitors. Reference is made to my copending applications Serial No. 457,743, filed September 9, 1942, Serial No. 460,688, filed October 3, 1942, and Serial No. 476,333, filed February 18, 1943.

Examples of refining metals which may be used for such purpose are lithium, sodium, potassium, rubidium, caesium, barium, strontium and calcium. Due to the availability and low cost of sodium and potassium, however, these metals are preferred for the use set forth herein.

Alloys of these metals, such as $NaPb_{10}$, $NaHg_4$, $NaCa_5$, $NaZn_{12}$, $KNa$, and the like, also may be employed for the removal of undesired impurities from diolefin fractions and/or mixtures. In general, the alloys of the respective metals react with the impurities present in such fractions and/or mixtures at a slower rate than the corresponding metals.

In general, therefore, it may be said that very finely divided metals in group Ia and IIa of the periodic system, and their reactive alloys, may be used to refine unsaturated hydrocarbons and unsaturated hydrocarbon fractions with very satisfactory results, particularly in the presence of one or more polymerization inhibitors.

Examples of polymerization inhibitors are (1) secondary aryl amines such as phenyl beta-naphthylamine, diphenyl-p-phenylene diamine, isopropoxydiphenyl amine, aldol-alpha-naphthylamine (and polymers thereof), symm. di-beta-naphthyl-p-phenylene diamine, trimethyl dihydroquinoline (and polymers thereof), and the ditolylamines; (2) phenolic compounds, such as p-tertiary butyl catechol and alkylated polyhydroxy phenols; and (3) reaction products of a ketone, such as acetone, and/or an aldehyde, such as formaldehyde and acetaldehyde, with an amine, such as aniline.

In general, I prefer to employ less than 10%, by weight, of polymerization inhibitor, based on the unsaturated hydrocarbon or unsaturated hydrocarbon fraction in batch treating processes, and the maximum total volume of suspending liquid in the treating system at any one time in the case of continuous treating processes. Good results also have been obtained by the use of less than 5% inhibitor and even 2% inhibitor in certain cases, particularly when one or more of the inhibitors listed in the preceding paragraph are employed.

I find that a solution of sodium, or a suspension or emulsion of very finely divided sodium, or a solution, suspension, or emulsion of one or more sodium alloys, is a particularly desirable agent for the continuous removal of certain undesirable impurities from diolefin fractions and/or mixtures, particularly when carried out in the presence of at least one polymerization inhibitor. Excellent results are obtained by the use of a suspension of very finely divided sodium containing an inhibitor.

The use of a polymerization inhibitor is of particular importance in the case of diolefins, such as butadiene, which are quite susceptible to polymerization when placed in contact with certain active metals, as well as active alloys thereof. Thus, sodium is a very active catalyst for the polymerization of butadiene and is employed for this purpose in several industrial processes, notably in Russia. The use of this material in very finely divided form for the refining of butadiene, therefore, must be carried out within well defined limits in order to prevent undue loss of butadiene due to polymerization. The success of the refining method employing finely divided sodium, or other active metals, or alloys, depends to a very considerable extent upon the presence therein of a polymerization inhibitor. It will be understood, of course, that an inhibitor must be very specific and powerful in action in order to retard the rate of polymerization of unsaturated hydrocarbons, such as butadiene, in the presence of a very active catalyst, such as finely divided sodium.

The refining operations may be carried out in any desired manner such as batch, multiple batch, batch countercurrent, continuous, and continuous countercurrent operations. Although the process may be carried out in a very satisfactory manner by each of these methods, I prefer to use the continuous or continuous countercurrent types of operation. However, it is to be understood that, generally speaking, the refining process is not limited to any method of operation.

Although the continuous refining operations also may be carried out in any desired manner, I prefer to conduct it in a vertical vessel or tower in which a certain height of a liquid suspension or solution of the active refining agent, preferably containing an inhibitor, is maintained. The material to be refined is passed upward through this column of reagent at a rate sufficient to insure the removal of the desired quantity and type of impurities present at the temperature employed. Reference is made to my copending application, Serial No. 457,475, filed September 5, 1942.

Other methods of contacting the material to be treated and the refining reagent also may be employed if desired. Thus, the diolefin fraction and/or mixture may be passed through a horizontal treating unit, such as a pipe or bank of pipes, containing a suspension of the desired refining reagent, or otherwise.

The suspending liquid employed for the preparation of the refining reagent may be of any desired type, provided that it does not react with any of the constituents of the refining reagent or the material to be treated to any substantial extent, and provided that it does not introduce any additional impurities into the material to be treated. I find that hydrocarbons and hydrocarbon fractions are particularly desirable materials for use as suspending mediums for refining reagents of the type described herein. Excellent results have been obtained by the use of aromatic hydrocarbons and aromatic hydrocarbon fractions for this purpose.

It is to be understood, of course, that the material to be treated dissolves to some extent in the suspending medium, consequently the suspending medium actually employed in the operation of the process usually comprises a mixture of the material to be treated and the suspending medium initially introduced into the system. Thus, in the treatment of a light oil butadiene fraction with a xylene suspension of finely divided sodium containing an inhibitor in a continuous system operating at 50° C. and atmospheric pressure, the suspending medium contained 11% of the butadiene fraction by weight after equilibrium conditions had been established.

In a similar manner, when refining a light oil butadiene fraction in a continuous system with a xylene suspension of finely divided sodium containing an inhibitor at 50° C. and a pressure of 50 pounds per square inch, gauge, the composition of the suspending medium after equilibrium conditions had been established was 76% butadiene fraction and 24% xylene.

The material being treated also may serve as a suspending medium for the refining reagent without the addition of any other material, if desired. Thus a light oil butadiene fraction may be introduced into the desired tower or vessel, together with the finely divided refining agent and inhibitor, after which the butadiene fraction is passed into the suspension of the refining agent in the butadiene fraction at the desired temperature, the charging rate and more particularly the operating pressure being adjusted to maintain the refining agent at the desired level in the vessel.

It is to be understood, of course, that the portion of the material to be treated which has been dissolved in the suspending medium or which has been employed as the suspending medium in the substantial absence of other liquid materials, does not necessarily remain in the treating zone throughout the entire treating cycle. Rather, this material is in a state of dynamic equilibrium with the material being treated, a portion of it volatilizing continuously and being removed from the system, the material volatilized in this manner being replaced by the solution of a corresponding quantity of freshly added material to be treated. The major portion of the material to be treated, of course, bubbles up through the suspending medium without dissolving therein.

The thickness of the layer of refining reagent through which the material to be treated is preferably passed depends upon a number of factors, such as the quantity and type of impurities present, the type and quantity of inhibitor employed, the extent to which such impurities are to be removed, the type and degree of dispersion of the treating agent employed, the reaction temperature, the concentration of the treating agent in the suspending medium, and the like. In general, however, I prefer to employ a layer of refining reagent at least one foot thick and, more preferably, at least two feet thick. Excellent results are obtained by the use of a layer of refining reagent at least four feet thick.

It will be recognized that, other things being equal, the depth of refining reagent employed in the treating vessel controls the contact time between the material to be refined and the refining reagent.

The degree of dispersion of the treating agent also has a very profound effect upon the degree of refining obtained. In the case of sodium, I prefer to employ a subdivided mass in which at least the majority of the particles present have a diameter of not more than 0.05" and, more preferably, not more than 0.03". Excellent results are obtained when at least the majority of the particles present have a diameter of not more than 0.02".

This subdivision may be carried out in any desired manner. Thus, in the case of sodium, a solution of this material in liquid ammonia may be introduced into an inert liquid, such as xylene, at room temperature or at elevated temperatures. The almost instantaneous volatilization of the ammonia present results in the dispersion of the sodium present in the xylene in an extremely finely divided state. Another method comprises spraying molten sodium into an inert liquid such as xylene or solvent naphtha. By suitable variations in the type and degree of fineness and/or dispersing ability of the spray nozzle employed, sodium of almost any desired degree of fineness may be obtained at will.

Another satisfactory method comprises melting the sodium under the surface of a suitable liquid, such as xylene, followed by violent agitation, such as with a turbo-mixer, and cooling with agitation. Other methods which may be used include extrusion through fine orifices, and the generation of an arc between sodium electrodes in an inert liquid.

Although almost any desired concentration of treating agent in the suspending medium may be employed, depending upon the type and concentration of the fraction to be refined, the temperature, the depth of reagent employed, and the like, I generally prefer to employ a refining reagent containing less than 30%, and more particularly less than 20%, by weight of the treating agent. Excellent results are obtained when less than 15% by weight of the treating agent is suspended in the suspending medium.

It is to be understood, of course, that the term suspending medium refers to the actual suspending agent employed during the treating operation, and includes any of the material being treated which may dissolve in such agent.

The type and concentration of the diolefin fraction and/or mixture to be treated also has a considerable influence upon the method of operating the process. Thus, with a highly concentrated butadiene, such as 98% butadiene, the refining reagent should preferably contain a fairly low concentration of active agent, and a fairly high concentration of inhibitor, to minimize losses due to polymerization.

I generally prefer to employ a fraction of such concentration, and with such proportion of suspending medium, that the actual concentration of diolefin, such as butadiene, in the reaction zone is less than 80%, and, more preferably, less than 70%. Excellent results are obtained when the actual concentration of unsaturated hydrocarbon in the reaction zone is less than 60%.

The process may be carried out at any desired pressure, such as atmospheric, subatmospheric, and superatmospheric pressures.

The temperature at which the process is conducted also has a very considerable bearing upon the degree to which the fraction is refined and the losses incurred due to polymerization. Although the optimum reaction temperature to be employed is dependent largely upon other factors, such as the concentration of both the diolefin and the refining reagent in the reaction zone, I generally prefer to conduct the refining operations at temperatures below 100° C. and, more particularly, below 80° C. Excellent results are obtained by conducting the refining operations at temperatures below 70° C. The rate at which the material to be refined is passed through the refining reagent has a very considerable effect upon the degree to which the impurities present are removed, although this is dependent to some extent upon other variables such as the concentration of refining agent in the suspending medium and the temperature at which the refining operations are being conducted. While it is difficult to establish exact limits for optimum throughputs under all conditions, I generally prefer not to exceed a throughput of material to be treated on an hourly basis of more than four times the weight of suspending medium employed and more preferably, not more than twice the weight of the suspending medium. Excellent results are obtained when not more than equal quantities of material to be treated, upon an hourly basis, are passed through the suspending medium.

It will be recognized that the contact time between the material to be treated and the reagent is determined both by the thickness of the layer of refining reagent employed and by the rate at which the material to be treated is passed through the reagent.

The method employed for introducing the material to be refined into the refining reagent also has some influence upon the extent to which the diolefin fraction and/or mixture is defined. In general, it may be said that a fine stream or jet of the liquid or gaseous material to be refined is desired. This may be accomplished by introducing the material to be treated into the refining reagent by means of suitable orifices, jets, nozzles, or other subdividing means. Porous objects or materials also may be employed for this purpose, such as porous ceramic or glass diffusing blocks or units.

As the refining agent may show some tendency to settle out in the bottom of the treating vessel or unit, the jets or nozzles by means of which the material to be treated is introduced into the unit may be so arranged as to prevent any undue settling of this material. In vertical vessels, this may be accomplished by locating these units in such a way as to impinge the inlet stream or streams upon the bottom of the treating vessel. The inlet jets also may be arranged tangentially to impart a swirling or circular motion to the refining reagent, if desired. Another method comprises locating the inlet jet or jets directly in the bottom of the reactor, or tangentially in the sides of the reactor, or both, to prevent any settling in the bottom of the reacting vessel and/or to impart any desired circular or other motion to the refining reagent.

Any desired combination of these methods also may be employed, such as the use of a jet or jets directly impinging upon the bottom of the reactor in conjunction with the use of a tangential jets or jets to prevent the active agent from settling out and depositing on the walls of the reactor and/or to maintain the refining reagent in any desired state of agitation.

The refining reagent also may be maintained in the desired degree of agitation by the use of suitable stirring or mixing devices, or by the use of circulating pumps, or by a combination of these methods, or otherwise. One or more of these methods also may be used in conjunction with one or more of the methods discussed previously to maintain the system in the desired degree of dispersion.

It should be pointed out, however, that the use of such agitation methods is not required in most cases. Thus, excellent results have been secured by conducting the refining operations in a tower, the material to be treated being introduced into the bottom of the tower by means of a small orifice. The passage of the fraction being treated in the gaseous state upward through the column was found to maintain the system in the desired degree of agitation.

The refining agent, particularly when finely divided sodium is employed for this purpose, usually acts both as a reactant and as a polymerizing agent for the removal of undesired impurities. Thus, in the case of light oil butadiene fractions containing monovinylacetylene, other acetylenes, aldehydes, and other oxygenated impurities, the sodium will react with at least a portion of the monovinylacetylene present to form sodium monovinylacetylide, and may react with certain of the oxygenated derivatives to form corresponding derivatives. At least a portion of the acetylenic hydrocarbons present also are polymerized to form polymers, or copolymers with other unsaturated hydrocarbons present, which frequently are insoluble in nature. Certain of the oxygenated derivatives, such as aldehydes, also may be polymerized to form polymers which may be insoluble in type.

As a result, the refining of diolefin fractions and/or mixtures with a suspension of finely divided sodium in the presence of an inhibitor is characterized by the gradual accumulation of insoluble polymers derived from the impurities present in the unsaturated hydrocarbon. These may be removed in any desired manner, such as by filtration, which may be carried out continuously during the refining operation, or may be carried out in a batchwise manner after the termination of the refining step.

As the removal of the insoluble polymers also is attended by some loss of refining agent, even when the latter is in a very fine state of subdivision, it is advisable in many cases to continue the refining operations until the refining agent has been largely or completely exhausted before filtering.

The solid or semi-solid filtered products may be treated to recover any desired materials or they may be disposed of in any suitable manner. Thus any unchanged refining agent, such as sodium, may be recovered by melting and coalescing operations, or by amalgamation with mercury, or otherwise. Certain of the reaction products, such as sodium monovinyl acetylide and/or other metallic acetylides, may be decomposed with water to regenerate the corresponding acetylenes or they may be reacted with carbon dioxide to form unsaturated acids, or otherwise. Any inhibitor present also may be recovered.

A convenient method for the disposal of the insoluble polymers comprises treatment with carbon dioxide, suitably in the presence of traces of moisture, followed by filtration.

As the cost of the treating process is largely a function of the quantity of the reactive agent employed in the refining operations, the efficient utilization of such agent is of considerable importance. A desirable method for insuring optimum utilization of the treating agent is to carry out the operations in a continuous countercurrent manner, the reagent moving through the system in a manner countercurrent to that of the material to be treated.

This may be illustrated by means of a consideration of a simple continuous countercurrent system comprising two treating towers or vessels. The material to be treated is passed into the first tower, which contains a partially exhausted reagent. This serves to remove a substantial portion of the impurities present, after which the partially refined material passes into the second tower, which contains a fresh, or more highly concentrated, reagent. This serves to remove the impurities present to the desired extent. The process is continued until the reagent in the first tower is almost, or completely, exhausted, after which it is discarded and the partially exhausted reagent from the second column substituted for it. Fresh reagent then is added to the second column.

In this manner the material to be treated and the refining reagent pass through the system countercurrent to each other, the first continuously and the second in a discontinuous manner.

This may be modified such as by the continuous addition of fresh reagent to the second tower, the continuous transfer of partially exhausted reagent to the first tower, and the continuous withdrawal of more completely exhausted, or exhausted, reagent from the first tower. A completely continuous countercurrent treating system thus is achieved.

Any desired modification of these methods may be employed, and any number of treating towers or units may be used. It will be observed that in each of the cases discussed, the incoming material to be refined is contacted with partially exhausted reagent (maximum concentration of impurities—minimum concentration of active agent), while the outgoing material to be refined is contacted with fresh or more highly concentrated reagent (minimum concentration of impurities—maximum concentration of active agent). Thus the two objectives to be sought, namely, practically complete, or complete, utilization of the active agent and substantial, or practically complete, removal of impurities from the material to be refined, are achieved.

As the limiting factor affecting the utilization of the active agent is the proportion of insoluble polymers and/or residues which can be contained therein without seriously impairing its flowing properties, or the passage of the gaseous material to be treated therethrough, it frequently happens that the quantity of insoluble material present is insufficient to interfere seriously with the operation of the process when the refining agent present has been almost completely exhausted. In this case, the operation of the unit may be continued by the addition thereto of an additional quantity of the refining agent, and this process may be continued until the concentration of insoluble material in the refining reagent renders it too viscous to be used further in the process in a satisfactory manner.

In this connection, it is well to point out that the insoluble products formed during the reaction have a tendency to stabilize the sodium suspension and act to reduce the rate of settling of the finely divided sodium in certain cases. As this is desirable, the incomplete removal of insoluble products from the refining reagent may be indicated, or even the addition of a certain quantity of such materials to a fresh reagent.

Soluble polymers also usually are formed in small amounts during the refining operations. As certain of these soluble and/or liquid polymers are converted on prolonged contact with the refining reagent to viscous and/or insoluble products, their removal from the suspending medium, suitably at the end of a refining cycle and prior to the return of the suspending agent to the system, may be indicated. On the other hand, certain of these soluble polymers are sufficiently stable to act as a suspending medium for the refining agent.

Having removed the impurities present to the desired extent by the use of one or more of the refining methods described previously, the next step in the process comprises the application of suitable concentrating processes designed to remove the diluents present to yield a product having the desired concentration.

This may include concentration by fractionation, solvent extraction, azeotropic distillation, or a combination of azeotropic distillation and solvent extraction methods.

The concentrating operations include contacting the diolefin fraction and/or mixture with one or more salts of metals of groups Ib and IIb of the periodic system. The salt or mixture of salts used for this purpose may be in the form of a solution in a suitable solvent, in the form of a suspension or slurry in a suitable organic or inorganic liquid, or in the form of solid, dry salts. Thus, for example, a solution of cuprous acetate in water containing relatively small quantities of ammonia; a suspension or slurry of cuprous chloride in water; or solid, dry, finely divided cuprous chloride may be employed for this purpose. Excellent results have been obtained by the use of the latter reagent.

Solid dry salts of metals of groups Ib and IIb of the periodic system and particularly monovalent salts of heavy metals of these groups, such as the halides, nitrates, sulfates, phosphates, formates, acetates, lactates, propionates, and carbonates of copper, mercury, and silver, may be employed for the recovery in more concentrated form from mixtures, either in the vapor or liquid phase, containing diolefines by the formation of an association product, or a complex, of one or more of said diolefins with one or more of said salts under suitable temperature and pressure conditions, which complex or association product may be afterward dissociated, usually after separation from the unreacted material, to liberate the diolefins and regenerate the reagent salt. Such dissociation or decomposition may be carried out by an increase in temperature and/or a reduction in pressure.

Monovalent cuprous salts are very desirable agents for use in concentrating processes of this type due to their stability, ease of regeneration, low cost, and availability. Cuprous chloride is a particularly desirable salt to be used for this purpose.

Under suitable conditions of temperature and pressure, conjugated diolefins may be made to react with reagents of the type described in preference to other unsaturated hydrocarbons.

Thus, the conjugated diolefins present in a given mixture may be contacted with cuprous chloride under conditions of temperature and pressure such that substantially only conjugated diolefin materials are absorbed by the reaction mass. Then after removal of unreacted hydrocarbon material, the complex formed between the conjugated diolefins and the cuprous chloride may be decomposed by elevation in temperature and/or reduction in pressure to liberate the conjugated diolefins in concentrated form and revivify the reagent.

As described and claimed in my copending application, Serial No. 457,187 filed September 3, 1942, the efficiency of such solid dry reagent salts is increased substantially by the incorporation therein of an organic or inorganic basic substance or an anhydride thereof, such as an oxide of an alkali metal and/or an oxide of an alkaline earth metal, in conjunction with an inhibitor, such as a secondary aryl amine, a polynuclear phenol, a polyhydroxy phenol, and/or a substituted phenolic material; and the reaction product of an aldehyde or a ketone with an amine.

As described and claimed in my copending application, Serial Number 460,692, filed October 3, 1942, such processes may be carried out in a particularly desirable manner when the dry reagent salt is maintained in an unusually fine state of subdivision during at least the initial phases of the absorption operations. Thus, exceptionally desirable results are obtained when at least the major portion of the dry reagent salt comprises particles having a diameter of less than 0.05 mm. and, more particularly, less than 0.03 mm. Even better results are obtained when at least the major portion of the dry reagent salt comprises particles having a diameter of less than 0.02 mm. and particularly less than 0.01 mm.

A particularly desirable method for insuring the production and maintenance of the dry reagent salt in the desired state of very fine subdivision comprises conducting the operations in a ball or rod mill. Additional means to maintain a relatively clean surface on the mill at all times, such as by the use of a scraping agitator, a plow or other device; by the use of irregularly-shaped grinding objects; and/or by the use of a double conical ball mill, also may be employed, if desired.

The exact conditions employed for the concentration of diolefins by the use of salts of metals of group Ib and IIb of the periodic system will vary somewhat with the character of the salt employed, as well as the method in which it is used. When employing solid, dry, finely divided cuprous chloride for this purpose, the absorption commonly is carried out at temperatures below 25° C., and more particularly below 20° C., while the desorption operations usually are carried out at temperatures above 50° C. When operating under reduced pressures, somewhat lower desorption, or decomposition, temperatures may be employed.

The process may be further illustrated by means of the following example.

*Example*

A light oil butadiene fraction containing 50% butadiene, 25% isobutylene, 21% butylenes, 2% butanes, 1% acetylenic hydrocarbons, 0.04% aldehydes, and small quantities of other impurities was passed continuously into the bottom of a 2" steel column containing a xylene suspension of very finely divided sodium at a temperature of 50° C. and a pressure of 50 pounds per square inch, gauge. The treating medium contained 0.05% of a substituted polyphenol as a polymerization inhibitor.

Under the operating conditions employed, the actual suspending medium was a mixture of 24% of xylene and 76% of the butadiene fraction. The quantity of finely divided sodium employed was 130 grams, representing a 7% suspension in the indicated suspending medium.

The run was continued for a total of 31 hours at an average charging rate of 840 grams per hour, the total quantity of butadiene fraction charged being approximately 2400 grams.

Only very small traces of the butadiene, butylenes, and butanes were removed during the refining operation. However, the acetylenic hydrocarbon content was reduced to 0.02%, the aldehydes to <0.001%, and the remaining minor impurities substantially completely removed.

The refined butadiene fractions is contacted with a mixture of 97.5 parts of finely divided, dry cuprous chloride, 2% calcium oxide and 0.5% phenyl-beta-naphthylamine contained in a ball mill provided with two scraping agitator blades for a period of 20 minutes at a temperature of 0–25° C. and a pressure of 0–60 lbs. per square inch. After removing unreacted material, the butadiene complex is decomposed by heating to a temperature of 60–80° C. A butadiene concentrate containing 99.5% butadiene is obtained, which is very suitable for the production of synthetic rubber. The olefin and paraffine portion of the charge stock, listed previously as unreacted material, is obtained in the form of a fraction containing only 5% butadiene.

In the specification and the claims, the following terms have the indicated meanings.

The term "polymerization inhibitor" is intended to include one or more compounds or materials which serve to retard, or entirely prevent, the polymerization of unsaturated hydrocarbons in the presence of an active refining agent.

The term "metals of group Ia and group IIa of the periodic system" is intended to mean lithium, sodium, potassium, rubidium, caesium, barium, strontium, and calcium, as well as active alloys containing one or more of such metals as an essential ingredient.

The term "finely divided" is intended to mean a material reduced to such a state of fineness that the preponderating part is composed of particles having a diameter of less than 0.05", as well as materials in the colloidal or dissolved form.

In the specification and claims the term "addition compound" is intended to include the reaction product of one or more diolefins with a reactive salt or compound, the said addition compound regenerating the diolefin or diolefins when heated above a certain temperature level.

While various procedures have been particularly described these are of course subject to considerable variation. Therefore, it will be understood that the foregoing specific examples are given by way of illustration and that changes, omissions, substitutions, and/or modifications might be made within the scope of the claims without departing from the spirit of the invention.

I claim:

1. A process for the recovery of diolefins from a mixture containing at least one diolefin comprising contacting said mixture with at least one of a group consisting of finely divided metals of groups Ia and IIa of the periodic system followed by contacting the remaining mixture with at least one solid, dry salt of a metal of groups Ib and IIb of the periodic system under conditions suitable for the formation of an addition compound between the said salt and the said diolefinic material, separating the unreacted material from the addition compound, and decomposing the said addition compound.

2. A process for the recovery of butadiene from a mixture containing the same comprising contacting said mixture with at least one of a group consisting of finely divided metals of groups Ia and IIa of the periodic system followed by contacting the remaining mixture with at least one solid, dry monovalent salt of a metal of groups Ib and IIb of the periodic system under conditions suitable for the formation of an addition compound between the said salt and the said butadiene, separating the unreacted material from the addition compound, and decomposing the said addition compound.

3. A process for recovery of isoprene from a mixture containing the same comprising contacting said mixture with at least one of a group consisting of finely divided metals of groups Ia and IIa of the periodic system followed by contacting the remaining mixture with at least one sol'd, dry monovalent salt of a metal of groups Ib and IIb of the periodic system under conditions suitable for the formation of an addition compound between the said salt and the said isoprene, separating the unreacted material from the addition compound, and decomposing the said addition compound.

4. A process for the recovery of piperylene from a mixture containing the same comprising contacting said mixture with at least one of a group consisting of finely divided metals of groups Ia and IIa of the periodic system followed by contacting the remaining mixture with at least one solid, dry monovalent salt of a metal of groups Ib and IIb of the periodic system under conditions suitable for the formation of an addition compound between the said salt and the said piperylene, separating the unreacted material from the addition compound, and decomposing the said addition compound.

5. A process for obtaining a more highly refined conjugated diolefin from a mixture containing the same comprising contacting said mixture with finely divided metallic sodium in the presence of a polymerization inhibitor, followed by contacting the remaining mixture with finely divided, dry cuprous chloride containing a polymerization inhibitor.

6. A process for obtaining a more highly refined conjugated diolefin from a mixture containing the same comprising contacting said mixture with a hydrocarbon suspension of finely divided metallic sodium in a continuous system, followed by contacting the remaining mixture with finely divided cuprous chloride.

7. A process for recovering a conjugated diolefin in more concentrated and less contaminated form from a mixture of said conjugated diolefin with impurity and diluent, comprising contacting said contaminated and diluted conjugated diolefin with at least one of a group consisting of finely divided metals of groups Ia and IIa of the periodic system to remove at least a portion of said impurity, contacting the remaining mixture containing said conjugated diolefin in less contaminated form with at least one monovalent salt of a metal of groups Ib and IIb of the periodic system under conditions suitable for the formation of an addition compound between said salt and said conjugated diolefinic material, separating unreacted material comprising at least a portion of said diluent from the addition compound, and decomposing said addition compound to recover said conjugated diolefin is less contaminated and more concentrated form.

8. A process for purifying a conjugated diolefin contained in admixture with impurity and diluent, comprising contacting said admixture with at least one of a group consisting of finely divided metals of groups Ia and IIa of the periodic system to remove at least a portion of said impurity followed by contacting the remaining admixture with at least one monovalent salt of copper under conditions suitable for the formation of an addition compound between said salt and said conjugated diolefinic material, separating unreacted material containing at least a portion of said diluent from the addition compound, and decomposing said addition compound to recover said conjugated diolefin in more concentrated and less contaminated form.

9. A process for recovery of a conjugated diolefin from a mixture containing the same in admixture with impurity and diluent, comprising contacting said mixture with at least one of a group consisting of finely divided metals of groups Ia and IIa of the periodic system to remove at least a portion of said impurity, followed by contacting the remaining mixture with solid dry cuprous chloride under temperature conditions below 20° C. to form a conjugated diolefin-cuprous chloride complex, separating unreacted material including at least a portion of said diluent from said complex, and decomposing said complex under temperature conditions above 50° C.

10. A process for the recovery of a conjugated diolefin from a mixture containing the same in admixture with impurity and diluent, comprising continuously passing said mixture at a temperature below 80° C. through a dispersion of at least one finely divided metal selected from the group consisting of metals of groups Ia and IIa of the periodic system, said dispersion containing a polymerization inhibitor, and containing less than 20% by weight thereof of said finely divided metal and being at least two feet in thickness in the direction of flow of said mixture, the concentration of said conjugated diolefin in the reaction zone being less than 70%, while maintaining a rate of flow per hour of said mixture through said dispersion of less than twice the weight of dispersion medium employed thereby removing at least a portion of said impurity, and thereafter contacting the remaining mixture with a monovalent salt of copper under conditions suitable for the formation of an addition compound between said salt and said conjugated diolefin, separating unreacted material containing at least a portion of said diluent from said addition compound, and decomposing the said addition compound.

11. A process for the recovery of a conjugated diolefin from a mixture containing the same with impurity including acetylenic material and with diluent, comprising continuously passing said mixture under temperature conditions below 80° C. through a dispersion of at least one finely divided metal selected from the group consisting of metals of groups Ia and IIa of the periodic system, said dispersion containing a polymerization inhibitor and containing less than 20% by weight thereof of said finely divided metal and being at least two feet in thickness in the direction of flow of said mixture, the concentration of said conjugated diolefin in the reaction zone being less than 70%, while maintaining a rate of flow per hour of said mixture through said dispersion of less than twice the weight of dispersion medium employed thereby removing at least a portion of said impurity including acetylenic material, followed by contacting the remaining mixture with solid dry cuprous chloride under temperature conditions below 20° C. to form a conjugated diolefin-cuprous chloride complex, separating unreacted material including at least a portion of said diluent from said complex, and thereafter decomposing said complex under temperature conditions above 50° C.

12. A process for recovery of a conjugated diolefin from a mixture containing the same and containing impurity including acetylenic material and containing diluent, comprising passing said mixture at a temperature below 80° C. through a reaction zone containing a dispersion of finely divided sodium at least the majority of the particles of which have a diameter of not more than 0.03", said dispersion containing a polymerization inhibitor and containing less than 20% by weight thereof of said finely divided sodium and being at least two feet in thickness in the direction of flow of said mixture, the concentration of said conjugated diolefin in said reaction zone being less than 70%, while maintaining a rate of flow per hour of said mixture through said dispersion of less than twice the weight of dispersion medium employed thereby removing at least a portion of said impurity including acetylenic material, and contacting the mixture containing said conjugated diolefin in less contaminated form with a monovalent salt of copper under conditions suitable for the formation of an addition compound between said salt and said conjugated diolefin, separating unreacted material containing at least a portion of said diluent from said addition compound, and thereafter decomposing the said addition compound to recover said conjugated diolefin in more concentrated and less contaminated form.

13. A process for the purification of a conjugated diolefin contained in admixture with impurity including acetylenic material and with diluent, comprising continuously passing said admixture at a temperature below 100° C. through a dispersion of finely divided sodium containing a polymerization inhibitor and being at least one foot in thickness in the direction of flow of said admixture, said dispersion containing less than 30% by weight thereof of said finely divided sodium and the concentration of said conjugated diolefin in the reaction zone being less than 80%, while maintaining the rate of flow per hour of said admixture through said dispersion at less than four times the weight of dispersion medium employed thereby removing at least a portion of said impurity including acetylenic material, and thereafter contacting the remaining admixture with solid dry finely divided cuprous chloride in the presence of a polymerization inhibitor at a temperature below 25° C. to form a conjugated diolefin-cuprous chloride complex, separating unreacted material including at least a portion of said diluent from said complex, and thereafter decomposing said complex at a temperature above 50° C.

14. A process for purifying a light oil conjugated diolefin fraction containing a conjugated diolefin and containing impurity at least a portion of which is in the form of acetylenic material and diluent at least a portion of which is in the form of olefinic material, comprising contacting said light oil conjugated diolefin fraction with finely divided potassium to remove at least a portion of said impurity including acetylenic material, contacting the remaining fraction with at least one monovalent salt of copper under conditions suitable for the formation of an addition compound between said salt and said conjugated diolefinic material, separating unreacted material including at least a portion of said olefinic material from the addition compound, and decomposing said addition compound to recover said conjugated diolefin in less contaminated and more concentrated form.

15. A process for purifying a light oil butadiene fraction containing butadiene and containing impurity at least a portion of which is in the form of acetylenic material and diluent at least a portion of which is in the form of olefinic material, comprising contacting said fraction with finely divided sodium to remove at least a portion of said acetylenic material, followed by contacting the remaining fraction with at least one monovalent salt of copper under conditions for the formation of an addition compound between said salt and said butadiene, separating unreacted material containing at least a portion of said olefinic material from the addition compound, and thereafter decomposing said addition compound to recover said butadiene in more concentrated and less contaminated form.

16. A process for purifying a light oil isoprene fraction containing isoprene and containing impurity at least a portion of which is in the form of acetylenic material and diluent at least a portion of which is in the form of olefinic material, comprising contacting said fraction with finely divided sodium to remove at least a portion of said acetylenic material, followed by contacting the remaining fraction with at least one monovalent salt of copper under conditions for the formation of an addition compound between said salt and said isoprene, separating unreacted material containing at least a portion of said olefinic material from the addition compound, and thereafter decomposing said addition compound to recover said isoprene in more concentrated and less contaminated form.

17. A process for purifying a light oil piperylene fraction containing piperylene and containing impurity at least a portion of which is in the form of acetylenic material and diluent at least a portion of which is in the form of olefinic material, comprising contacting said fraction with finely divided sodium to remove at least a portion of said acetylenic material, followed by contacting the remaining fraction with at least one monovalent salt of copper under conditions for the formation of an addition compound between said salt and said piperylene, separating unreacted material containing at least a portion of said olefinic material from the addition compound, and thereafter decomposing said addition compound to recover said piperylene in more concentrated and less contaminated form.

18. A process for the purification of a light oil conjugated diolefin fraction containing a conjugated diolefin together with impurity at least a portion of which is in the form of acetylenic material and diluent at least a portion of which is in the form of olefinic material, comprising continuously passing said fraction at a temperature below 80° C. through a dispersion of finely divided sodium, said dispersion containing a polymerization inhibitor and containing less than 20% by weight thereof of said finely divided metal and being at least two feet in thickness in the direction of flow of said fraction, the concentration of said conjugated diolefin in the reaction zone being less than 70%, while maintaining a rate of flow per hour of said fraction through said dispersion of less than twice the weight of dispersion medium employed thereby removing at least a portion of said acetylenic material, thereafter contacting the remaining portion with solid dry cuprous chloride under conditions suitable for the formation of an addition compound between said salt and said conjugated diolefin, separating unreacted material including at least a portion of said olefinic material from said addition compound, and decomposing said addition compound to recover said conjugated diolefin in more concentrated and less contaminated form.

FRANK J. SODAY.